US012362121B2

(12) United States Patent
Gomes et al.

(10) Patent No.: US 12,362,121 B2
(45) Date of Patent: Jul. 15, 2025

(54) SOLID STATE PARALLEL ARC ISOLATING DEVICE

(71) Applicant: Hamilton Sundstrand Corporation, Charlotte, NC (US)

(72) Inventors: Alex Gomes, Chicago, IL (US); Robert L. Seagren, Rockford, IL (US); Joshua C. Swenson, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/502,447

(22) Filed: Nov. 6, 2023

(65) Prior Publication Data

US 2025/0149284 A1 May 8, 2025

(51) Int. Cl.

*H01H 9/00* (2006.01)
*H01H 9/38* (2006.01)
*H01H 33/04* (2006.01)
*H01H 39/00* (2006.01)
*H01H 85/02* (2006.01)

(52) U.S. Cl.

CPC ...... *H01H 85/0241* (2013.01); *H01H 9/0066* (2013.01); *H01H 9/38* (2013.01); *H01H 33/04* (2013.01); *H01H 39/004* (2013.01)

(58) Field of Classification Search

CPC ........... H01H 9/38–465; H01H 9/0066; H01H 33/04–045; H01H 33/12–143; H01H 85/0241; H01H 39/004

See application file for complete search history.

(56) References Cited

U.S. PATENT DOCUMENTS

| | | | | |
|---|---|---|---|---|
| 7,016,171 | B2 * | 3/2006 | Bax | H01H 83/226 361/45 |
| 9,742,185 | B2 | 8/2017 | Wang et al. | |
| 10,374,410 | B2 | 8/2019 | Niehoff | |
| 10,381,829 | B2 | 8/2019 | Jouper et al. | |
| 10,569,895 | B2 | 2/2020 | Handy | |
| 10,985,548 | B2 | 4/2021 | Telefus | |
| 11,047,899 | B2 * | 6/2021 | Peralta | G01R 31/008 |
| 11,239,649 | B2 | 2/2022 | Zhou et al. | |
| 11,398,724 | B1 * | 7/2022 | Yang | H02H 3/20 |
| 2009/0168273 | A1 | 7/2009 | Yu et al. | |
| 2010/0254046 | A1 * | 10/2010 | Liu | H02H 3/087 361/13 |
| 2022/0115859 | A1 | 4/2022 | Zhou et al. | |

OTHER PUBLICATIONS

European Search Report for Application No. 24211244.9, mailed Mar. 12, 2025, 11 pages.

* cited by examiner

*Primary Examiner* — Jacob R Crum
(74) *Attorney, Agent, or Firm* — CANTOR COLBURN LLP

(57) ABSTRACT

A high voltage contact control system includes main contacts on positive and negative feeder lines and a short circuit protection system configured between the positive feeder line and the negative feeder line. The short circuit protection system is configured to be operably connected between the positive and negative feeder lines and configured to selectively provide a bypass path between the positive feeder line and the negative feeder line to divert current away from the first and second contacts. The short circuit protection system includes first and second state arc prevention elements that can operate in at least two modes. The bypass path is established by having one of the arc prevention elements in a fully on mode and another either fully on or in a linear mode.

8 Claims, 8 Drawing Sheets

SOLID STATE PARALLEL ARC ISOLATING DEVICE

BACKGROUND

The following description relates to controlling to protecting hardware by providing arc protection when opening contacts and especially during a short circuit event.

Contactor assemblies are used in electrical applications, such as aircraft power distribution systems, where power and current flow control of single or multi-phase power distribution system is required. A primary power distribution assembly typically has a panel on which several electrical contacts are mounted.

Each of the contacts is connected to an electrical bus bar and allows current to flow through the contact and the corresponding bus bar whenever the contact is in a closed position. The electrical power and current flow through the contact is controlled by mechanically actuating a contact plate within the contact such that, when current flow is desired to pass through the contact, the contact plate is pushed into electrical contact with two leads and forms an electrical path coupling the leads and thereby allowing current to flow through it.

In aerospace electric power generation and distribution systems, electric power is provided from power sources such as generators, converters, Transformer Rectifier Units (TRUs), and batteries to load buses or between load buses via such contacts. In the event of a failure, contacts may be closed to provide power from an alternate power source or opened to prevent cascading failure effects.

These contactors may be controlled by control units such as generator control units or bus power control units. Determination for whether these contacts should be open or closed is performed in controller software or firmware based on a number of inputs such as generator voltage, bus voltage, TRU voltage, etc. pending the controller type.

In a short circuit event, the controller determines that the contacts should be opened. In such a case, however, due to the short circuit, a high energy arc may be formed across the main contacts preventing isolation via the main contacts of a contactor. One approach to ensure the arc is not formed (or if it is that it is extinguished quickly) is to provide a fuse in-line with the contact. The fuses can be traditional fuses or so-called "pyrofuses." Both types of fuses are "one-time use" devices that need to be replaced after they have been blown or otherwise activated.

BRIEF DESCRIPTION

Disclosed is a high voltage contact control system. The system includes a first main mechanical contact configured to be connected to a positive feeder line, the first contact being controlled by a drive voltage and having a first portion and a second portion that when in contact allow current to flow between them; and a second main mechanical contact configured to be connected to negative feeder line, the second contact having a first portion and a second portion that when in contact allow current to flow between them. The system also includes a short circuit protection system configured to be operably between the positive and negative feeder lines and configured to selectively provide a bypass path between the positive feeder line and the negative feeder line that diverts current away from the first and second contacts. The short circuit protection system includes: a first solid state arc prevention element that can operate in at least two modes; a second solid state arc prevention element connected in series with the first solid state arc prevention and that can operate in at least two modes; and a controller that upon detection of short circuit causes one of the first solid state arc prevention element and the second solid state arc prevention element to operate in a fully ON mode and an other of the first solid state arc prevention element and the second solid state arc prevention element to operate in a linear mode or a fully ON mode to establish the bypass path.

In addition to one or more of the features described above, or as an alternative to any of the foregoing embodiments, the system can further include a sensor to sense the short circuit.

In addition to one or more of the features described above, or as an alternative to any of the foregoing embodiments, the short circuit protection system can be upstream of the first and second main mechanical contacts.

In addition to one or more of the features described above, or as an alternative to any of the foregoing embodiments, the controller is configured to cause the first and second solid state arc prevention elements to operate in the ON or linear modes by applying control signals to them.

In addition to one or more of the features described above, or as an alternative to any of the foregoing embodiments, the first contact is configured to be opened by removing the drive voltage from it.

In addition to one or more of the features described above, or as an alternative to any of the foregoing embodiments, the controller provides the control signals before the drive voltage is removed.

In addition to one or more of the features described above, or as an alternative to any of the foregoing embodiments, the controller is configured to selectively apply the control signals to manage heat in the first and second solid state arc prevention elements.

In addition to one or more of the features described above, or as an alternative to any of the foregoing embodiments, the second contact is controlled by the drive voltage.

Also disclose is a method of controlling a contact. The method includes: determining that short circuit exists on a positive feeder line; opening a first contact connected to the positive feeder line, the first contact being a mechanical contact, being controlled by a drive voltage and having a first portion and a second portion that when contacting allow current to flow between them; and while or before opening the first contact, establishing a bypass path upstream the first contact, the bypass path being established by a short circuit protection system connected between the positive feeder line and a negative feeder line that diverts current away from the first contact, wherein the bypass pass includes a first solid state arc prevention element and a second solid state arc prevention element connected in series, wherein the bypass path is established by causing one of the first solid state arc prevention element and the second solid state arc prevention element to operate in a fully ON mode and an other of the first solid state arc prevention element and the second solid state arc prevention element to operate in a linear mode or a fully ON mode.

In addition to one or more of the features described above, or as an alternative to any of the foregoing method embodiments, short circuit is sensed by a sensor.

In addition to one or more of the features described above, or as an alternative to any of the foregoing method embodiments, a controller receives information from the sensor and causes the bypass path to be established based on the received information.

In addition to one or more of the features described above, or as an alternative to any of the foregoing method embodiments, the controller is configured to cause the first and second solid state arc prevention elements to operate in the ON or linear modes by applying control signals to them.

In addition to one or more of the features described above, or as an alternative to any of the foregoing method embodiments, the first contact is configured to be opened by removing the drive voltage from it.

In addition to one or more of the features described above, or as an alternative to any of the foregoing method embodiments, the controller provides the control signals before the drive voltage is removed.

In addition to one or more of the features described above, or as an alternative to any of the foregoing method embodiments, the controller is configured to selectively apply the control signals to manage heat in the first and second solid state arc prevention elements.

BRIEF DESCRIPTION OF THE DRAWINGS

The following descriptions should not be considered limiting in any way. With reference to the accompanying drawings, like elements are numbered alike.

DETAILED DESCRIPTION

While specific embodiments are further discussed below, it has been discovered that while the current fail-safes utilized in the industry may be effective, certain improvements can be made. In particular, the short circuit arc protection system (protection system) disclosed herein allows internal main contacts arcing to be reduced or eliminated in all situations and in short circuit situation in particular. This can be accomplished, for example, by diverting energy (e.g., current) from the main mechanical contacts as they are opened. In one embodiment, the protection system can be reusable. For example, in one embodiment, elements such as fuses can be omitted from the protection system and, thus, and do not need to be replaced when a short is detected. The reusability can also allow for non-destructive testing of the protection system.

Figure 1:
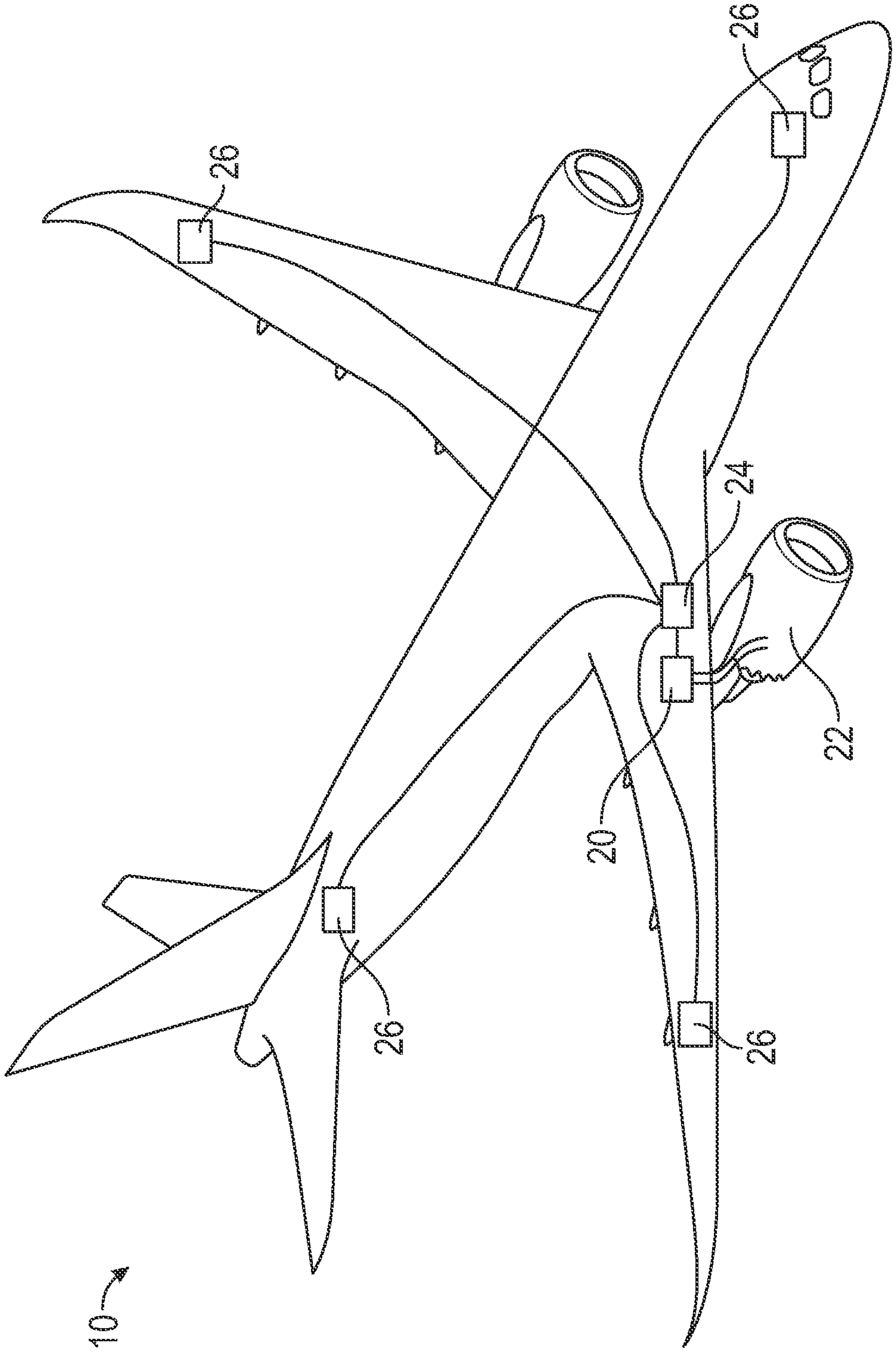
FIG. 1 is a perspective view of an aircraft in accordance with embodiments.

With reference to FIG. 1, an aircraft 10 is provided and includes an electrical power generation system 20 which utilizes rotation within the jet engines 22 to generate either single phase or multi-phase electrical power which is rectified to produce DC power. Further, the power could be DC power that is provided by batteries, converters or fuel cells. In this example, DC power in range of 800Vdc or more is being distributed through the system. Embodiments herein are related to contacts that are used for distributing DC power regardless of whether it is created by an AC source and rectified or it is from a DC source (e.g., battery).

The power is sent to a panel box 24 that contains multiple electrical buses and contactor assemblies for controlling how the power is distributed throughout the aircraft 10. Through the use of the contact assemblies, power may be controlled for each onboard electrical load.

Figure 2:
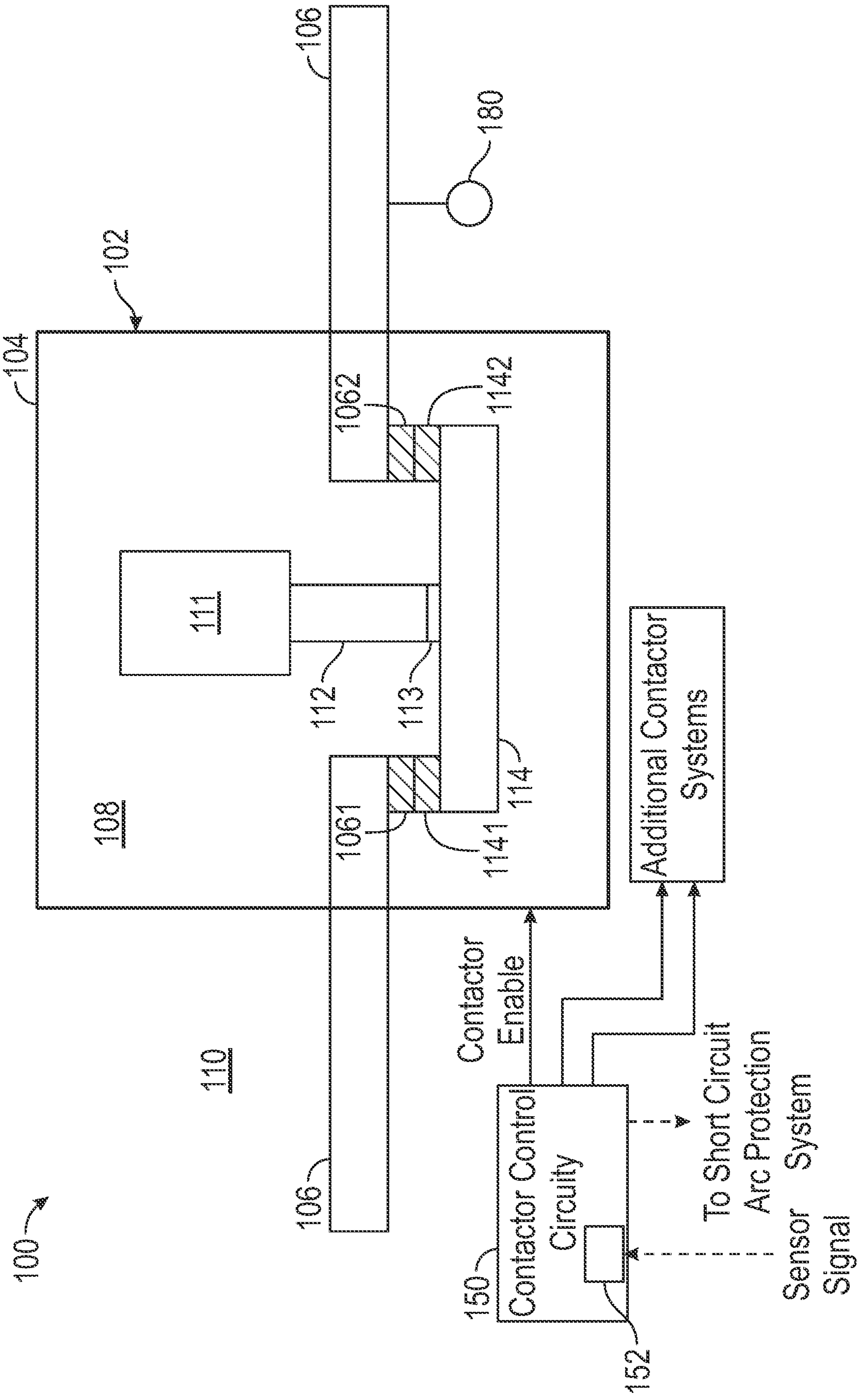
FIG. 2 is an example contact that can be used in embodiments disclosed herein.

An exemplary panel box 24 includes multiple bus bars that can be connected to various aircraft systems by contactor assemblies (or simply contactors). Not by way of limitation but for example only, FIG. 2 shows an example of a contactor assembly 100 of panel box 24 (see FIG. 1). The contactor assembly 100 includes an electrical contactor 102 that in turn includes a housing 104 and internal bus bars 106. The housing 104 is formed to define an interior 108 and the internal bus bars 106 extend into the interior 108 from an exterior 110 of the housing 104.

The contact assembly 100 further includes a contact actuator 111 that can be, for example, a solenoid that includes a plunger 112 with an insulator 113 at a distal end thereof and a movable bus bar 114. At a central portion thereof, the movable bus bar 114 is coupled to the plunger 112 via the insulator 113. At opposite ends thereof, the movable bus bar 114 includes contact pads 1141 and 1142. The movable bus bar 114 is movable by the contact actuator 111 into a first position and a second position.

At the first position, the contact pads 1141 of the movable bus bar 114 contact the stationary contact pads 1061 and 1062 such that the corresponding individual internal bus bars 106 are electrically coupled with one another. At the second position, the contact pads 1141, 1142 are displaced from the stationary contact pads 1061 and 1062 such that the corresponding internal bus bars 106 are decoupled from one another.

Thus, in operation, the electrical contactor 102 is operable in a first mode or in a second mode. In the first mode, corresponding internal bus bars 106 are electrically coupled with each other in the interior 108 of the housing 104. In the second mode, the corresponding internal bus bars 106 are electrically decoupled from one another in the interior 108 of the housing 104.

In FIG. 2, whether or not the contact actuator 111 moves the bus bar 114 into the first or second position is based on a contactor enable signal received from the contactor control circuitry 150. That circuitry 150 can include operating logic 152. The operating logic 152 can include standard control logic (e.g., when to open/close the contact) and can include additional logic that controls operation of the short circuit arc protection circuit discussed further below. The contactor control circuitry 150 can be, for example, in generator/motor control unit, in an inverter control unit, or in a bus power control unit (e.g., in a controller in the panel box 24) to name but a few.

The operating logic 152 can be any hardware of software (or combination thereof) that is used to determine whether a particular contact should be opened of closed. Determination of whether a particular contact should be open or closed is performed in controller software or firmware in the logic 152 and can be based on a number of inputs such as generator voltage/current, bus voltage/current, TRU voltage/current depending on the controller type. In the below explanation, the operating logic can receive signal from a sensor that indicates that a short circuit has occurred. The signal can be directly from a sensor 180 (e.g, a current sensor) or from another sensor or controller etc. In the event a short circuit occurs, the contact actuator 111 moves the bus bar 114 into the second (open) position. Further, it shall be understood that the contactor control circuitry 150 can provide contactor enable signals to additional contactor assemblies 100. These signals can be provided to a mechanical contactor or can be provided to a solid-state contactor/control element.

As shown more fully below, in addition, the contactor control circuitry 150 can provide one or more signals to a protection system. The signal(s) can be a gate or other control terminal signal of a solid-state switch. When the signal is at the desired level (e.g., high or low depending on the type of solid-state switch that is used) current through the contactor main mechanical contacts (e.g., between the bus bars 106) may cease or be reduced by providing an alternate path for current to bypass the contactor assembly 100. That is, the protection circuit below will reduce current through the contacts before or while the contacts are being opened. The reduced current can prevent arcing between, for example, elements 1061/1141 and 1062/1142 when the contactor 102 opens.

Figure 3A:
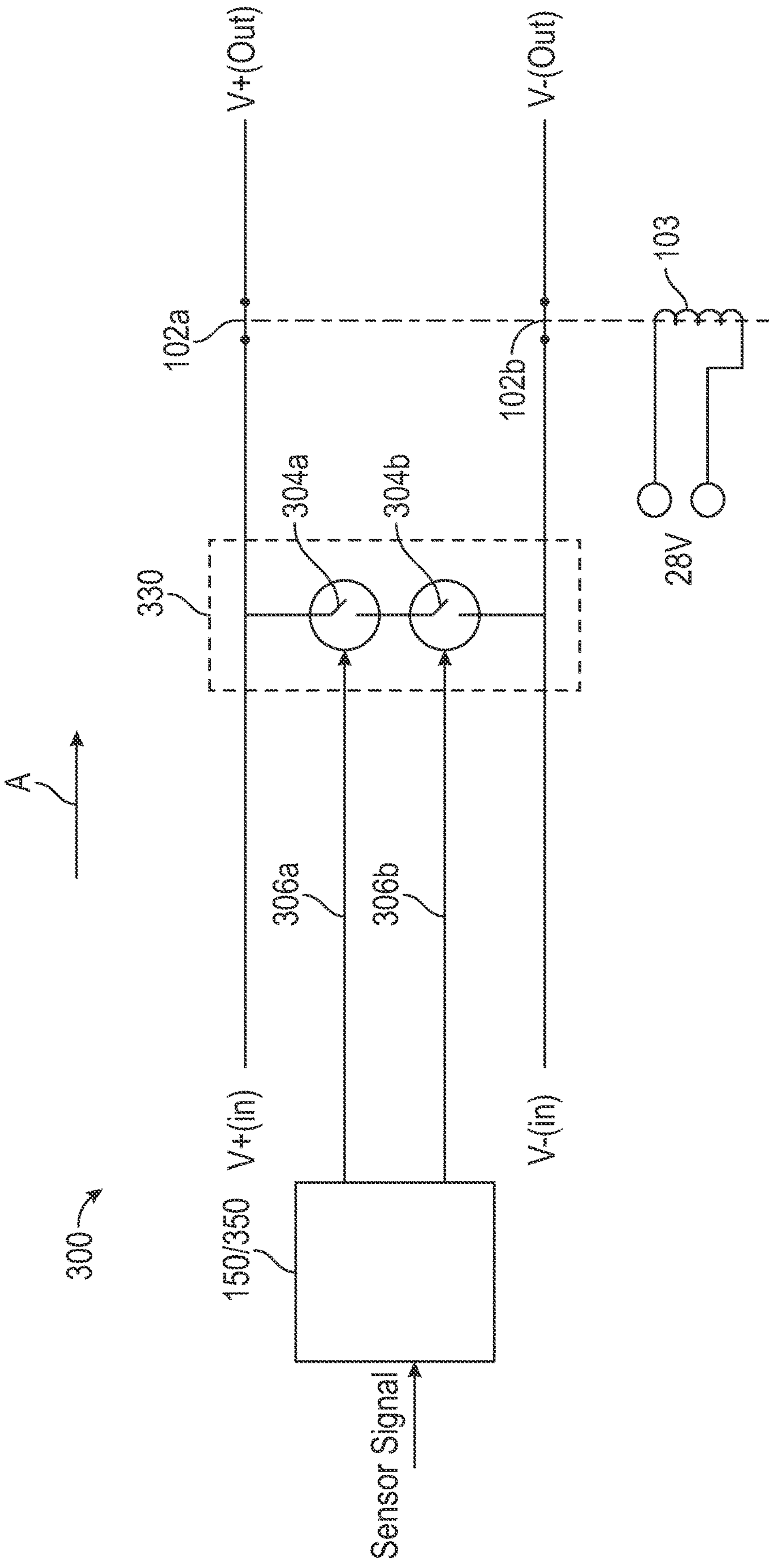
FIG. 3A shows a system according to one embodiment during normal operation.
Figure 3B:
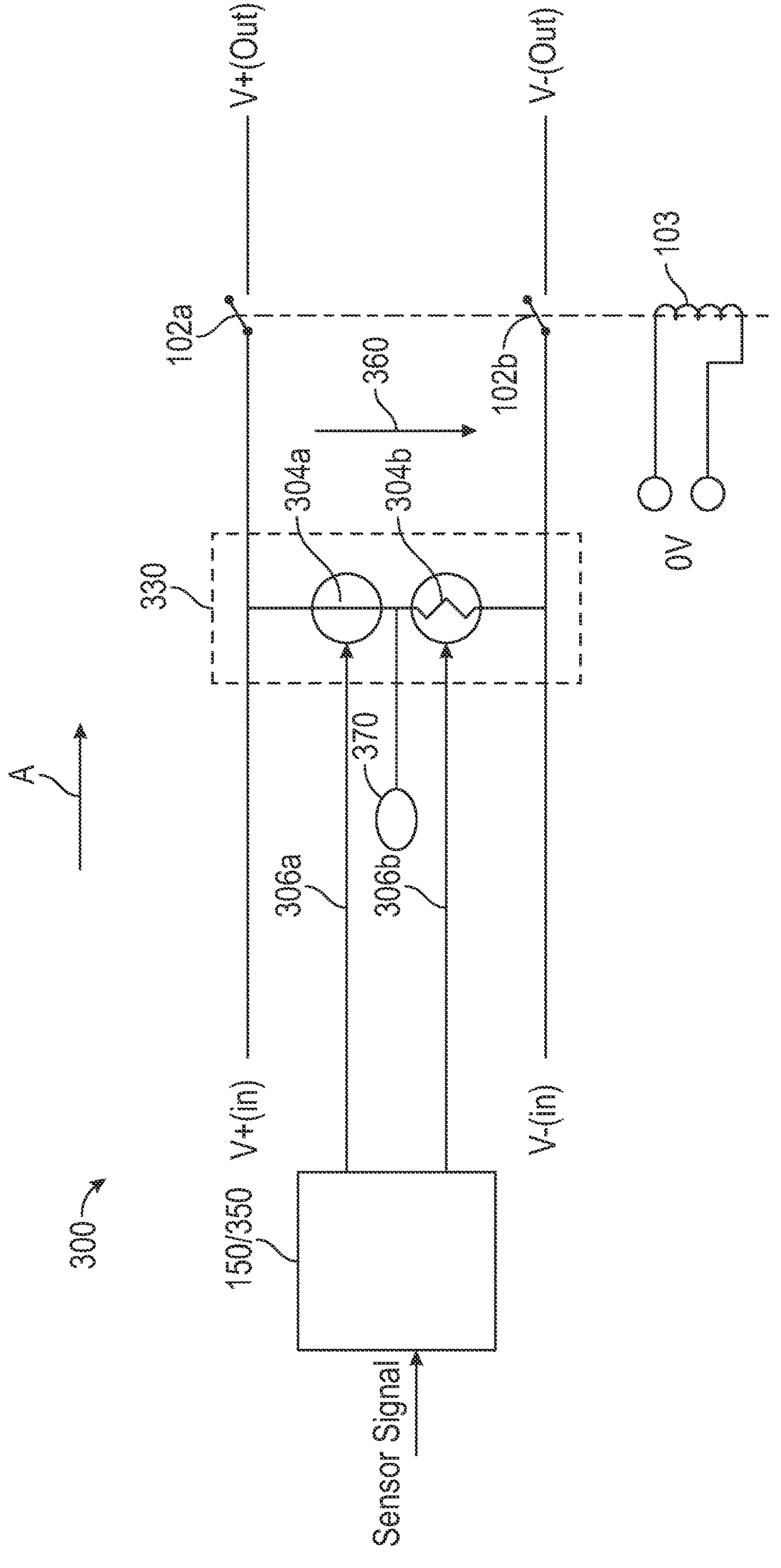
FIG. 3B shows a system according to one embodiment during a short condition configured in one possible orientation.
Figure 3C:
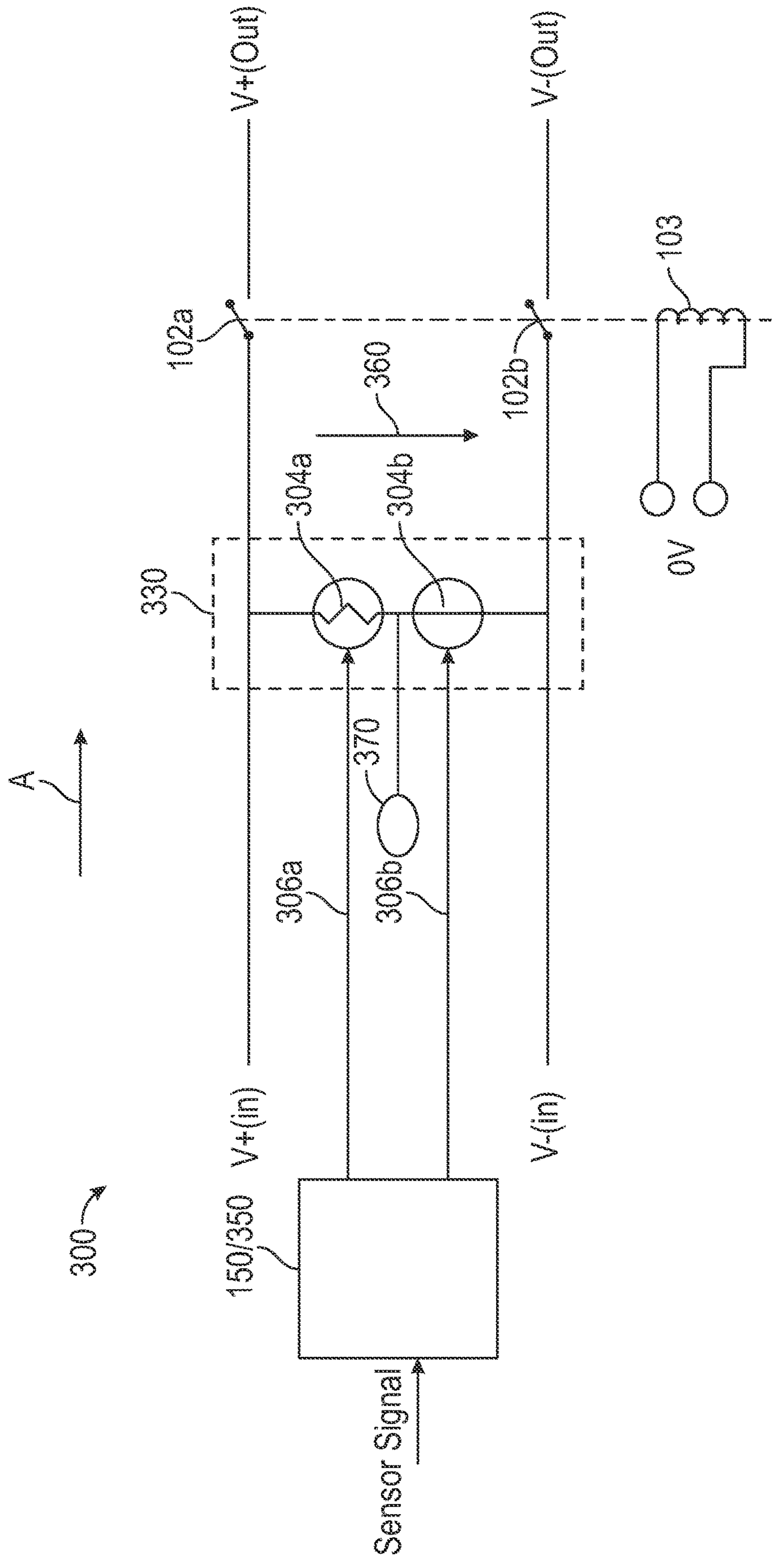
FIG. 3C shows a system according to one embodiment during a short condition configured in one possible orientation.

With reference now to FIGS. 3A to 3C, portions of a power supply system 300 are illustrated. The system 300 includes two main contacts (102*a*, 102*b*), one for the main positive line (V+) and one for the main negative line (V−). These contacts are mechanical in nature and may be referred to as main mechanical contacts herein. The lines (V+ and V−) are high voltage DC lines (feeders) in one embodiment. As such, the voltage on V+ and V− can be +/−135+/−270Vdc, +/−400Vdc or even higher. Indeed, these lines can carry high current in high voltage networks in some cases. The teachings herein apply to all situations but more particularly to high voltage. Herein, power/current is assumed to flow from V(in) to (Vout). Thus, stated differently, the direction of power/current flow is from upstream to downstream in the direction indicated by arrow A.

In FIGS. 3A-3C the contacts 102*a*, 102*b* are mechanical contacts that can be same or similar to those shown in FIG. 2. As shown, the contacts 102*a*, 102*b* are controlled by a coil 103. The coil 103 can be part of the contact actuator 111 of FIG. 2. In one embodiment, each contact 102*a*/102*b* can be controlled by the same coil For ease of depiction, only one coil 103 is illustrated but it shall be understood that each contact 102*a*/102*b* may be controlled by its own coil 103.

When current is supplied to the coil 103, the contacts are closed as shown in FIG. 3A. To open the contacts 102*a*, 102*b* the coil is deenergized as shown in FIGS. 3B/3C. The coil 103 can be a single coil or a separate coil for each line V+/V−. As shown, the coil 103 can receive 28V but that is for example only and other voltages could be used. The lines V+/V− can correspond to bus bars 106 or other feeder lines as will be understood by the skilled artisan.

In FIGS. 3B and 3C, the contacts are open. This corresponds 0V being supplied into the coil 103 (e.g., solenoid) of the contacts 102*a*, 102*b*.

FIG. 3A-FIG. 3C include a short circuit arc protection system 330. The protection system 330 in general, is operated by having arc prevention elements 304*a*/304*b* which receive control signals 306*a*, 306*b* from a controller.

When a short circuit is detected, the protection system 300 moves from the configuration shown in FIG. 3A to the configuration shown in FIGS. 3B/3C. In particular, when a short is detected, the contacts 102*a*/102*b* are opened. As noted above, in the case of short, however, such opening can lead to arcing across the contacts 102*a*, 102*b*.

To reduce or eliminate arcing in the contacts, the protection circuit 330 is configured to provide a bypass path 360 between V+ and V− so as to divert power/current from flowing from V+(in) to V+(out) and/or from V−(in) to V−(out). The arc prevention elements 304*a*/304*b* are shown as being serially and directly connected to each other to establish the bypass path 360 between V+ and V. Of course, other elements could be included in the bypass path 360. Regardless, the bypass path 360, thus, will reduce power/current flowing through the contacts 102*a*/102*b* and thereby reduce or eliminate arcing in the main mechanical contacts.

In any embodiment herein, the contact control circuitry 150 of FIG. 2 can provide the control signals 306*a*, 306*b* to the protection system 330 or another circuit can provide the signals. Regardless, in one embodiment, the voltage or other signal can be provided to the short circuit arc protection system 330 at the same time or before the contact enable signal is changed to cause the contacts 102*a*/102*b* to open.

The arc prevention elements 304*a*/304*b* are solid state elements in one embodiment. Thus, the arc prevention elements 304*a*/304*b* can also be referred to as solid state arc prevention elements 304*a*/304*b*. For example, the arc prevention elements 304*a*/304*b* can be MOSFETs.

In one embodiment, one or both of the MOSFETS can be operated in the linear (or saturation) mode. The arc prevention elements 304*a*/304*b* (e.g., MOSFETS) can include at least three modes, a "closed or OFF" mode, a linear mode and a fully ON (or enhanced) mode.

In the fully on mode, the arc prevention elements 304*a*/304*b* presents a near zero impedance. In the linear mode, arc prevention elements 304*a*/304*b* operate in its saturated state, or saturation region, and it behaves as a (gate) voltage controlled current source. That is, in the liner mode, small changes of Vgs of the arc prevention elements 304*a*/304*b* result in linear changes of the drain to source current (e.g, the "resistance" of the MOSFET changes linearly with Vgs). It should be noted that as compared to the fully ON (or fully enhanced) mode, in the linear mode, the drain-source impedance is relatively high, resulting in high power dissipation/heat.

Suppose for example that a short is detected by the sensor 180 of FIG. 2, in such a state, the controller 150 can provide control signals 306*a*, 306*b* to the arc prevention elements 304*a*/304*b* to establish the bypass path 360. In one embodiment, one of the arc prevention elements (e.g., element 304*a*) can be operated in the fully on mode and the other arc prevention element (e.g., element 304*b*) can be operated in the linear mode so as to provide some resistance in the bypass path 360 between V+ and V−. Element 304*b* is shown as having a resistance to indicate that it is being operated in the linear mode in FIG. 3B.

As noted above, in the linear mode, the MOSFET can heat up. Thus, to keep heating at an appropriate level, at least two approaches can be applied. For example, as shown in FIG. 3C, the modes of the arc prevention elements 304*a*/304*b* can be reversed so that heat does not develop in only one of them. Thus, as shown in FIG. 3C one of the arc prevention elements (e.g., element 304*b*) can be operated in the fully on mode and the other arc prevention element (e.g., element 304*a*) can be operated in the linear mode so as to provide some resistance in the bypass path 360 between V+ and V−. Element 304*a* is shown as having a resistance to indicate that it is being operated in the linear mode in FIG. 3C. Thus, in one embodiment, the controller 150 can switch back and forth between the configurations of FIGS. 3B and 3C by changing the appropriate control signals 306*a*, 306*b* to the arc prevention elements 304*a*/304*b* so as to change their modes.

In another embodiment, the controller 150 can remain in either the configuration of FIG. 3B or FIG. 3C and manage heat by periodically making one or both of arc prevention elements 304*a*/304*b* non-conductive. Of course, combinations of the two approaches just described are also contemplated, including operating both arc prevention elements in the fully on mode.

In any embodiment herein, a test current sensor 370 can be arranged to measure current through the bypass path 360. This sensed current can be used to vary the control signals 306*a*, 306*b* during operation as will be understood by the skilled artisan. Further, the current sensed by sensor 370 also can be used to test the protection system 330 in a non-destructive manner to ensure that the arc prevention elements 304*a*/304*b* are working properly by activating them and sensing a current and deactivating them and determining that no current is passing through the bypass path 360. Of course, the sensor 370 could be located in different locations.

Figure 4A:
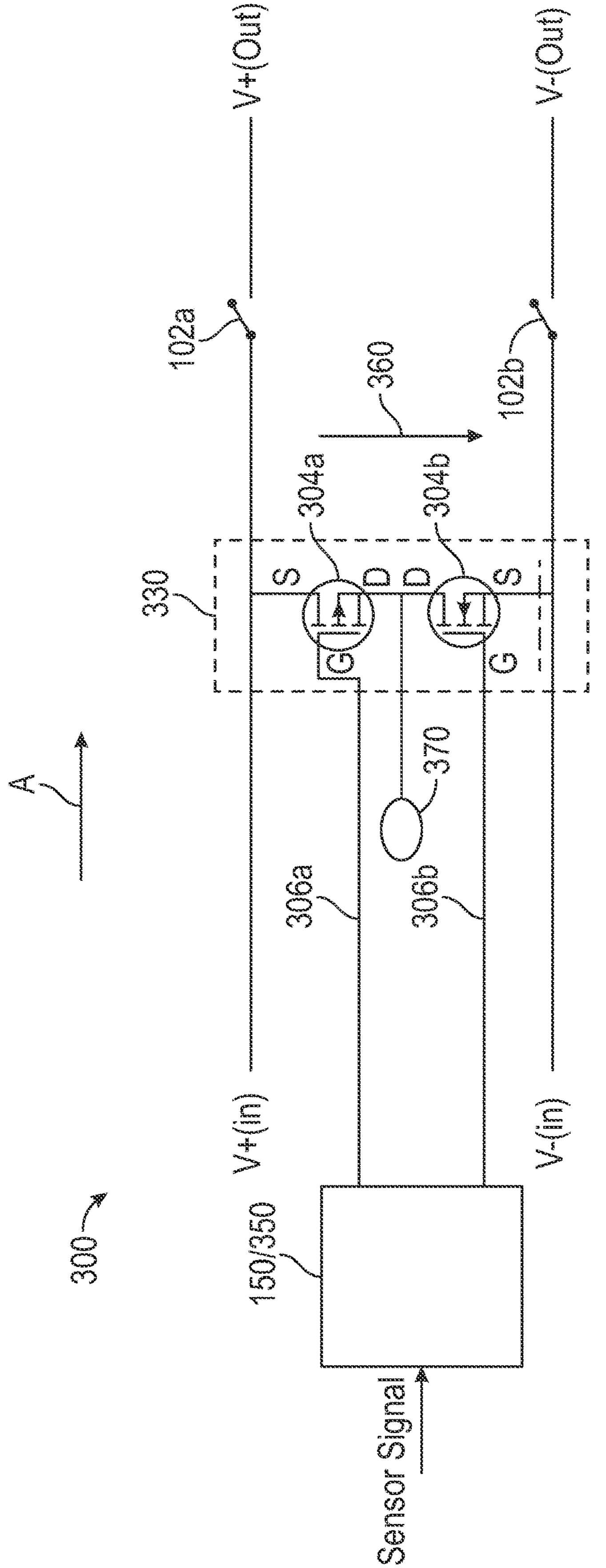
FIG. 4A shows a system according to one embodiment with the solid state arc prevention element in one configuration.

In one embodiment, the arc prevention elements 304*a*/304*b* can be implemented as one P-channel FET and one N-channel FET as shown in FIG. 4A.

Figure 4B:
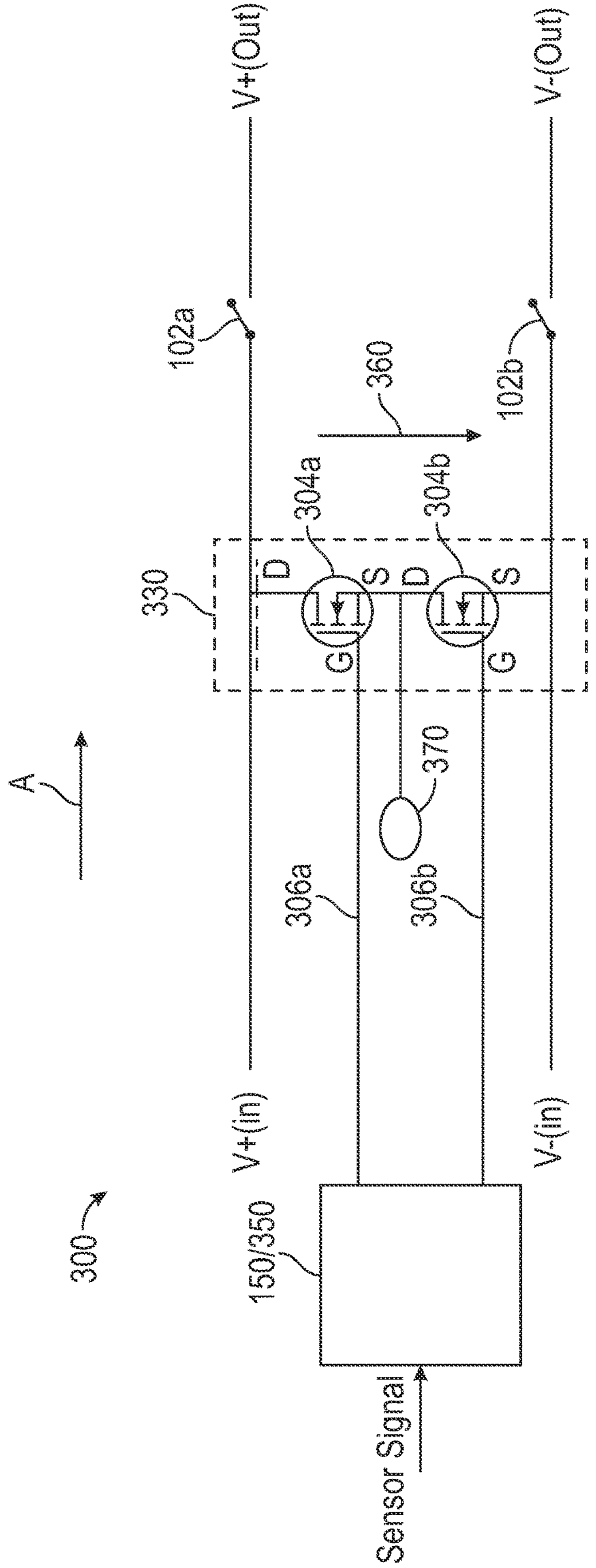
FIG. 4B shows a system according to one embodiment with the solid state arc prevention element in another configuration.

In another embodiment, the arc prevention elements 304*a*/304*b* can be implements as two N-channel FETs as shown in FIG. 4B.

Figure 5:
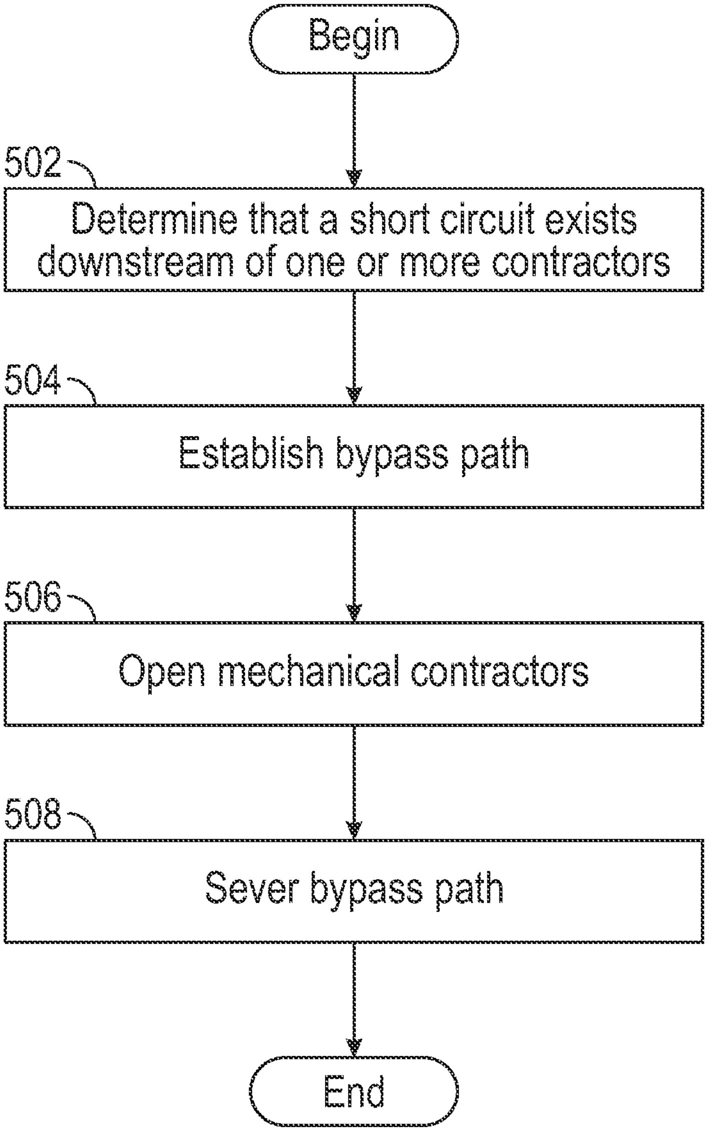
FIG. 5 is flow chart illustrating a method according to one embodiment.

From the above, it shall be understood that the systems herein can be operated to create a bypass path 360 in the event of short circuit downstream of the contacts 102*a*/102*b*. To that end, FIG. 5 is one method of operation an arc prevention circuit as disclosed. As above, the arc prevention circuit 330 can be connected between V+ and V− upstream of the contacts 102*a*/102*b*. The arc prevention circuit 330 can include elements as shown in any embodiment herein. Of course, the arc prevention circuit 330 can also include other elements (e.g., resistors, inductors, etc.) as needed to manage the current through the bypass path 360 if needed.

The method includes determining that a short circuit exists downstream of the one or more contacts 102*a*/102*b* as indicated at block 502. The detection of the short circuit can be made by a controller 150/350.

Then, the bypass path 360 can be established as indicated at block 504. Establishment of the bypass path 360 can include operating one of arc prevention elements 304*a*/304*b* in a fully on mode and the other in a linear mode. It shall be understood that the establishing the bypass path 360 can include any of the operating the arc prevention elements 304*a*/304*b* in any of the manners described above. At block 506, the main contacts 102*a*/102*b* can be opened.

At block 506, the bypass path 360 can be severed by making the arc prevention elements 304*a*/304*b* non-conductive after the short has been cleared or the system is powered down (or both).

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A high voltage contact control system comprising:

a first main mechanical contact configured to be connected to a positive feeder line, the first contact being controlled by a drive voltage and having a first portion and a second portion that when in contact allow current to flow between them;

a second main mechanical contact configured to be connected to a negative feeder line, the second contact having a first portion and a second portion that when in contact allow current to flow between them;

a short circuit protection system configured to be operably between the positive and negative feeder lines and configured to selectively provide a bypass path between the positive feeder line and the negative feeder line that diverts current away from the first and second contacts, the short circuit protection system comprising:

a first solid state arc prevention element that can operate in at least two modes;

a second solid state arc prevention element connected in series with the first solid state arc prevention and that can operate in at least two modes; and a controller configured to, upon detection of a short circuit, cause one of the first solid state arc prevention element or the second solid state arc prevention element to operate in a fully ON mode and an other of the first solid state arc prevention element and the second solid state arc prevention element to operate in a linear mode or a fully ON mode to establish the bypass path.

2. The system of claim 1, further comprising:

a sensor to sense the short circuit.

3. The system of claim 2, wherein the short circuit protection system is upstream of the first and second main mechanical contacts.

4. The system of claim 3, wherein the controller is configured to cause the first and second solid state arc prevention elements to operate in the ON or linear modes by applying control signals to them.

5. The system of claim 4, wherein the first contact is configured to be opened by removing the drive voltage from it.

6. The system of claim 5, wherein the controller provides the control signals before the drive voltage is removed.

7. The system of claim 4, wherein the controller is configured to selectively apply the control signals to manage heat in the first and second solid state arc prevention elements.

8. The system of claim 1, wherein the second contact is controlled by the drive voltage.

* * * * *